United States Patent
Koefod

(10) Patent No.: US 7,658,861 B2
(45) Date of Patent: Feb. 9, 2010

(54) CORROSION-INHIBITING DEICER COMPOSITION

(75) Inventor: Robert Scott Koefod, Maple Grove, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 11/754,560

(22) Filed: May 29, 2007

(65) Prior Publication Data

US 2007/0278446 A1 Dec. 6, 2007

Related U.S. Application Data

(60) Provisional application No. 60/809,617, filed on May 31, 2006.

(51) Int. Cl.
C09K 3/18 (2006.01)
(52) U.S. Cl. .......................................... 252/70; 106/13
(58) Field of Classification Search ................... 252/70; 106/13
See application file for complete search history.

(56) References Cited

U.S. PATENT DOCUMENTS 4,448,702 A * 5/1984 Kaes ............................ 252/70
5,531,931 A 7/1996 Koefod
5,891,225 A * 4/1999 Mishra et al. ............. 106/14.42
6,800,217 B2 * 10/2004 Koefod et al. ................. 252/70
6,861,009 B1 * 3/2005 Leist ............................ 252/70

FOREIGN PATENT DOCUMENTS

DE 40 34 217 A1 5/1991
WO WO 99/37732 7/1999

* cited by examiner

Primary Examiner—Anthony J Green

(57) ABSTRACT

A deicing composition comprises a mixture of a deicing agent and a corrosion inhibitor. The corrosion inhibitor comprises an effective amount of a polyhydroxy carboxylic acid, preferably an aldaric or aldonic acid. The salts of aldaric and aldonic acids are much more potent corrosion inhibitors for deicing than agricultural by-products or refined sugars that are today commonly used as corrosion inhibitors, and therefore can be used at lower concentrations to obtain the same effect as a higher concentration of a simple sugar. The deicing composition can be used as a deicer, anti-icer, or a pre-wetting agent. The deicing agent can include a deicing salt such as sodium chloride, magnesium chloride, and/or calcium chloride. Further, a method of making a deicing composition includes mixing a deicing agent and a corrosion inhibitor. The corrosion inhibitor can be dissolved in a liquid, such as brine, which can be sprayed on a solid deicing salt.

14 Claims, No Drawings

CORROSION-INHIBITING DEICER COMPOSITION

RELATED APPLICATION

The present application claims the benefit of, and incorporates by reference, the U.S. Provisional Application Ser. No. 60/809,617, filed on 31 May 2006 and entitled "Corrosion-Inhibiting Deicer Composition."

BACKGROUND

This disclosure relates generally to corrosion-inhibiting compositions used as deicers, anti-icers or pre-wetting agents. Additionally, the invention relates to deicing and anti-icing compositions such as brine solutions with corrosion inhibitors.

Liquid deicing chemicals such as aqueous solutions of sodium chloride, magnesium chloride, and calcium chloride are being increasingly used both as deicing and anti-icing liquids by themselves, and as pre-wetting agents for rock deicing salt. Highway maintenance organizations are increasingly requiring that chloride deicing and anti-icing liquids contain corrosion inhibitors. A common requirement is that deicing liquids be at least 70% less corrosive than pure sodium chloride as measured by a standard industry alternate immersion corrosion test. Identification of suitable corrosion inhibitors for liquid deicers has proven to be a challenge. Phosphates have been used as corrosion inhibitors for solid sodium chloride-based deicers, but they are not sufficiently soluble in concentrated chloride brines to provide a liquid formula that meets customer specifications. Suitable corrosion inhibitors must be low cost, soluble in concentrated brine, and be environmentally acceptable.

Recently, agricultural by-products such as molasses, distiller's solubles, and corn steep liquor have been used as corrosion inhibitors for liquid deicers and anti-icers. A drawback to these inhibitors is that relatively high concentrations must be used to obtain the corrosion inhibition required by customers. Since the agricultural additives themselves often have little ice melting capacity, the need to use high concentrations also has the effect of reducing the ice melting capacity of the deicing compound.

Major components of many of these agricultural additives are simple sugars (e.g. mono and disaccharides). For example, the major constituents of cane molasses are sucrose, glucose, and fructose. Thus, another current approach currently in use is to add sources of refined sugars (e.g. corn syrup) to deicing compounds as corrosion inhibitors. However, this has the same disadvantage of crude agricultural by-products—namely, high concentrations of the sugar are required to achieve the necessary corrosion inhibition. This is undesirable because it decreases the ice melting capacity of the deicer. In addition, high amounts of these refined sugars impart a high biological oxygen demand to the compound. It is therefore desirable to find corrosion inhibitors that are effective at low concentrations in order to minimize cost, environmental impact, and attenuation of the deicer's ice-melting capacity.

SUMMARY

The compositions and methods disclosed herein are aimed at providing an improved method and composition for a deicing compound, an anti-icing compound, or a pre-wetting agent to be added to a solid deicer. According to one aspect of the present disclosure, the composition comprises a mixture of a deicing agent and a corrosion inhibitor. The composition can include a deicing agent such as sodium chloride, calcium chloride, magnesium chloride, potassium chloride, or mixtures thereof. In one aspect, the deicing agent can be brines of sodium chloride, magnesium chloride, potassium chloride and/or calcium chloride. The corrosion inhibitor can include polyhydroxy carboxylic acids such as aldaric and aldonic acids or the salts of aldaric and aldonic acids. The oxidation of the monosacharide aldehyde group to a carboxyl group yields an aldonic acid. Further oxidation of the alcohol group yields a dicarboxylic aldaric acid. It has been found that the salts of aldonic and aldaric acids are much more potent corrosion inhibitors for deicing compounds than simple sugars, and therefore can be used at lower concentrations to obtain the same effect as a higher concentration of a simple sugar.

The composition can additionally include other compounds used in deicers, such as pre-wetting agents, anti-caking agents, flow-enhancers, thickeners and colorants. The composition can be used as a deicer, anti-icer, or pre-wetting agent to be added to solid deicers. For example, the deicing composition can be used as a pre-wetting agent to improve the performance and application of the solid deicer by dissolving the corrosion inhibitor in a liquid, such as an aqueous solution of magnesium chloride, which can be sprayed on or blended with a solid deicing salt such as sodium chloride, magnesium chloride, calcium chloride, or mixtures thereof. Alternatively, the composition can be used as an anti-icer or deicer solution comprising a mixture of a liquid chloride and a corrosion inhibitor.

DETAILED DESCRIPTION OF ILLUSTRATIVE EMBODIMENTS

According to one aspect of the present disclosure, the deicing composition comprises a mixture of a deicing agent and a corrosion inhibitor. A variety of deicing agents can be used. Typically, a deicing agent is a substance having at least a component that, when combined with water or ice, forms a liquid that has a lower melting point than water. A deicing salt is typically a salt that, when combined with water or ice, forms a liquid that has a lower freezing point than water. By way of example, sodium chloride can be mixed with water to form a brine solution with a freezing point lower than 0° C. Suitable deicing agents can include sodium chloride, calcium chloride, magnesium chloride, potassium chloride, or mixtures thereof. More specifically, the deicing agent can include the brines of sodium chloride, magnesium chloride, calcium chloride, and potassium chloride. Such brine solutions are typically used as an anti-icer by being applied prior to a snow or ice event to prevent bond formation of the snow or ice to a surface. These brine solutions can also be used as a deicer to be applied to surfaces after a snow or ice event to melt the snow or ice. Common brine solutions used can include a solid salt such as sodium chloride dissolved in water. The concentration of a sodium chloride brine solution can be 20-30 percent by weight, more preferably 23-27 percent by weight, and more preferably 25-26 percent by weight.

Deicing agents can also include brine solutions of magnesium chloride. The magnesium chloride can be derived from liquid bittern, which is a product derived from sea salt production, and is the liquid remaining after removal of sodium chloride from seawater. Liquid bittern normally contains water along with a high concentration of magnesium chloride and lower concentrations of other salts. In most implementations, the liquid bittern contains from 20 to 35 percent by weight magnesium chloride. However, in other implementations liquid bittern can contain less than 20 percent by weight magnesium chloride.

Suitable corrosion inhibitors to be used in the deicing composition can include effective amounts of polyhydroxy carboxylic acids, more specifically, polyhydroxy carboxylic acids such as aldaric and aldonic acids, or the salts of aldaric and aldonic acids, and more specifically compounds such as gluconic acid, D-erythronic acid, D-gulonic acid, saccharic acid, meso-tartaric acid (erytharic acid), tartaric acid (threaric acid), L-mannonic acid and the like. Monosacharide aldehyde groups (e.g., glucose) can be oxidized to form a carboxylic compound. These carboxylic groups can include compounds such as aldonic acid. Suitable aldonic acids that can be used as corrosion inhibitors in effective amounts can include gluconic acid, D-erythronic acid, D-gulonic acid and the like. An effective amount of an aldonic acid can be used as a corrosion inhibitor at far lower levels than commonly used agricultural by-products or refined sugars to achieve the same corrosion rate. In one embodiment, an effective amount can be from about 0.1 to about 10 percent by weight, more preferably from about 0.5 to about 5.0 percent by weight, and more preferably from about 1.0 to about 3.0 percent by weight.

Suitable corrosion inhibitors to be used in the deicing composition can also include effective amounts of polyhydroxy carboxylic acids such as aldaric acids such as saccharic acid, meso-tartaric acid (erytharic acid), tartaric acid (threaric acid), L-mannonic acid and the like. Further oxidation of the alcohol group of an aldonic acid can yield a dicarboxylic aldaric acid. Like aldonic acids, aldaric acids are even more potent corrosion inhibitors than the commonly used agricultural by-products or refined sugars. Indeed, an effective amount of a corrosion inhibitor such as aldaric acid in the deicing composition can be far more potent than a comparable amount of a solution containing a simple sugar such as glucose. In one embodiment, an effective amount can be from about 0.1 to about 10 percent by weight, more preferably from about 0.5 to about 5.0 percent by weight, and more preferably from about 1.0 to about 3.0 percent by weight. The use of smaller amounts of a corrosion inhibitor results in overall lower cost, lower environmental impact and greater ice-melting capacity from the deicing agent.

The deicing composition can also be used as a pre-wetting agent to be added to solid deicers such as sodium chloride, magnesium chloride, calcium chloride, potassium chloride, and combinations thereof. Pre-wetting involves the addition of a liquid to a solid deicer by any number of conventional methods (including spraying it directly onto the solid deicer, or mixing it by use of a mixing apparatus and method as claimed in U.S. Pat. No. 7,100,760, issued on Sep. 5, 2006, to Hoerle et al. and commonly assigned with the present application) to improve the performance and application of the solid deicer, thereby giving it increased resistance to freezing, increasing deicing performance, and additionally to improve storage characteristics, flowability and prevention of hardening or caking of the solid deicer. The deicing composition typically depresses the freezing point of solid deicers as well as inhibits corrosion. As a result, the deicing composition reduces freezing and hardening of the solid deicers into large pieces that are difficult to apply. The deicing composition can consist of a deicing agent, such as a brine of a chloride, mixed with a corrosion inhibitor comprising a polyhydroxy carboxylic acid such as a salt of an aldonic or aldaric acid. The resulting deicing composition can then be used as a pre-wetting agent by spraying on or blending with the solid deicing salt. When the deicing composition is used as a pre-wetting agent, other compounds are often added to the composition. These can include other pre-wetting agents, anti-caking agents, flow-enhancers, thickeners, colorants and the like.

EXAMPLES

Corrosion tests were run according to NACE Standard TM0169-95 modified so that the test procedure uses 30 mL of a 3% solution of deicer per square inch of coupon surface area. The coupons used are ASTM F 436, Type 1 flat steel washers with approximate dimensions 1.38 in. outer diameter, 0.56 in. inner diameter, and 0.11 in. thick with a density of approximately 7.85 grams per cubic centimeter and a Rockwell Hardness of C 38-45. Coupons are wiped with hexane to remove grease and oil and then are acid etched with a solution of approximately 19% HCl for approximately 2-3 minutes. The coupons are then quickly rinsed with tap water, distilled water, and placed in acetone. The coupons are removed from the acetone, allowed to air dry and then weighed to the nearest 0.1 mg.

Approximately 280 milliliters (a sufficient volume to provide 30 mL of solution per square inch of coupon area) of each solution as prepared above is put into a 500 milliliter Erlenmeyer flask. Each flask is equipped with a rubber stopper that has been drilled to allow a line to run through it. Three coupons are mounted in a plastic holder that is suspended inside the flask through the stopper hole. A timed device raises and lowers the test coupons so that they are completely immersed in the test solutions for 10 minutes and then raised so they are suspended within the flask and above the test solution for 50 minutes. This cycle is repeated for 72 hours. Tests are conducted at room temperature. At the end of the exposure period the coupons are removed from the test solutions and scrubbed with a nylon brush under running water to remove coarse corrosion products. They are then immersed in a cleaning solution of approximately 3.8% hydrochloric acid and 0.1% Rodine 213 in warm tap water for approximately 20 minutes. The coupons are then removed, scrubbed again with a nylon brush under running water, immersed in an acetone bath and allowed to air dry. The coupons are then re-weighed to the nearest 0.1 mg. Fresh coupons that have not been exposed to the test solutions are also taken through the same cleaning procedure to determine the weight loss due to the cleaning process. The weight loss due to cleaning is subtracted from the total weight loss of the test coupons to determine the actual corrosion weight loss. A corrosion rate in mils per year is calculated from the measured coupon weight loss. The percent reduction in corrosion rate compared to salt is calculated as follows:

$$\% \text{ Corrosion Reduction in Salt Induced Corrosion} = \frac{\text{weight loss of salt control} - \text{weight loss of test sample}}{\text{weight loss of salt control} - \text{weight loss of water}} \times 100.$$

Thus, pure water will have a corrosion reduction of 100%, and the salt control will have a corrosion reduction of 0%. This provides a relative comparison of the corrosiveness of various test formulas compared to deionized water and pure sodium chloride. In this calculation, a negative value of % corrosion reduction would indicate a formula that showed a higher corrosion rate than the salt control, and a value greater than 100% would indicate a formula that showed a lower corrosion rate than water.

Table 1 shows corrosion rates measured on 3% sodium chloride (0.153 M NaCl) brines containing various simple monosaccharides, aldonic acid salts, or aldaric acid salts. All test solutions contained 0.153 M NaCl and $2.45 \times 10^{-3}$ M corrosion inhibitor, except that glucose was also tested as a corrosion inhibitor at $24.5 \times 10^{-3}$ M. The salts of D-Gulonic acid and D-erythronic acid were prepared by stirring the corresponding gamma lactone with one equivalent of potassium hydroxide in water overnight.

TABLE 1

Mild Steel Corrosion Rates in 0.153 M Sodium Chloride and Corrosion Inhibitors

| Corrosion Inhibitor | Corrosion Rate (mpy) |
| --- | --- |
| None (control) | 54.4 |
| 2.45 mM Glucose | 48.8 |
| 24.5 mM Glucose | 38.8 |
| 2.45 mM Gluconate | 23.8 |
| 2.45 mM Saccharate | 13.4 |
| 2.45 mM D-Gulonate | 20.4 |

Gluconate is the aldonic acid anion derived from glucose. The data in Table 1 shows that oxidation of glucose to gluconate greatly increases its corrosion inhibition. At the same 2.45 mM concentration in the NaCl brine, the solution containing gluconate gave an over 50% lower corrosion rate. Indeed, raising the glucose concentration by a factor of ten does not bring the corrosion inhibition to the level observed with 2.45 mM gluconate. Further oxidation of gluconate to form the dicarboxylic sacharate ion yields an even more potent corrosion inhibitor. At the same 2.45 mM concentration, the solution containing saccharate showed a 73% lower corrosion rate than the solution containing 2.45 mM glucose and 75% lower corrosion rate than the salt control. The salt of D-gulonate (the aldonic acid derived from the sugar Gulose) was an even more effective corrosion inhibitor than gluconate.

TABLE 2

Mild Steel Corrosion Rates in 0.153 M Sodium Chloride and Corrosion Inhibitors

| Corrosion Inhibitor | Corrosion Rate (mpy) |
| --- | --- |
| None | 51.6 |
| 4.0 mM Gluconate | 26.5 |
| 4.0 mM Glucose | 50.0 |
| 40.0 mM Glucose | 45.4 |
| 80.0 mM Glucose | 38.8 |
| 4.0 mM meso-tartrate | 24.0 |
| 4.0 mM tartrate | 27.5 |
| 4.0 mM L-(−) mannose | 42.2 |
| 4.0 mM L-mannonate | 27.4 |

Table 2 shows further examples of the effectiveness of aldonic and aldaric acid salts as corrosion inhibitors in chloride brines. The experiment summarized in Table 2 compared the corrosion inhibition of 4.0 mM gluconate to a series of higher concentrations of glucose. Even when the concentration of glucose was twenty times higher, it did not achieve the level of corrosion inhibition provided by 4.0 mM gluconate. Table two also shows results of two shorter chain aldaric acids. Meso-tartaric acid is another name for erythraric acid (the aldaric acid derivative of the four carbon erythrose) and tartaric acid is another name for the threaric acid (the aladric acid derivative of the four carbon chain threose). The data in Table 2 shows that solutions of tartrate and meso-tartrate are also very effective corrosion inhibitors in NaCl brine. Table 2 also shows another example of the increase in corrosion inhibition that results from oxidizing a hexose to the corresponding aldonic acid. A solution on L-mannonate (the salt of L-mannonic acid, which was in this case prepared by hydrolysis of L-mannonic gamma lactone with one equivalent of KOH) gave a much lower corrosion rate than a solution with the same concentration of the parent mannose.

Table 3 shows corrosion test results on some liquid deicer formulas based on 30% $CaCl_2$ brine. In each case the test solution was prepared by making a 3% (v/v) dilution of the liquid deicer formula. Corrosion rates are listed as % Reduction in corrosion compared to 3% NaCl.

TABLE 3

Mild Steel Corrosion Rates on $CaCl_2$ Liquid Deicer Formulas

| Liquid Deicer Formula | % Corrosion Reduction |
| --- | --- |
| 30% $CaCl_2$ brine | −41% |
| 1.0% Na Gluconate, 99.0% $CaCl_2$ brine | 33% |
| 1.0% K Saccharate, 99.0% $CaCl_2$ brine | 76% |

Table 3 shows that low concentrations of aldaric acid salts and aldonic acid salts such as gluconate or saccharate salts are also very effective corrosion inhibitors in calcium chloride brines.

All patents and publications referred to above are incorporated herein by reference. The particular embodiments disclosed above are illustrative only, as the compositions and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

I claim:

1. A deicing composition comprising a mixture of:
   a deicing agent; and
   a corrosion inhibitor comprising at least one salt of an aldonic or aldaric acid chosen from salts of D-erythronic acid, D-gulonic acid, L-mannonic acid, and mixtures thereof,
   wherein the deicing composition is capable of reducing corrosion of mild steel by at least about 70%, as compared to a 3% solution of sodium chloride devoid of the corrosion inhibitor,
   wherein the corrosion inhibitor is present in an amount ranging from about 1.0% to about 3.0%, and
   with the proviso that said deicing composition does not comprise molasses solids.

2. The deicing composition of claim 1, wherein the deicing agent is present in an amount ranging from about 20% to about 30% by weight.

3. The deicing composition of claim 1, wherein the deicing agent comprises a liquid deicing agent.

4. The deicing composition of claim 3, wherein the liquid deicing agent comprises a water solution of salts of sodium, magnesium, potassium, calcium, or mixtures thereof.

5. The deicing composition of claim 4, wherein the corrosion inhibitor is capable of reducing the corrosion rate of mild steel in an aqueous solution of 0.153 M sodium chloride by at least about 70% when the corrosion inhibitor is present in the solution at a concentration of 4.0 mM or lower.

6. A method of deicing, comprising
   mixing a brine of a deicing agent with from about 1.0% to about 3.0% by weight of a corrosion inhibitor comprising at least one salt of an aldonic or aldaric acid, with the proviso that said brine does not contain molasses solids; and
   applying said brine to a surface, wherein the brine is capable of reducing corrosion of mild steel by at least about 70%. as compared to a 3% solution of sodium chloride devoid of the corrosion inhibitor.

7. The method of claim 6, wherein the brine comprises from about 20% to about 30% by weight the deicing agent.

8. The method of claim 6, further comprising prewetting a solid deicer with the combination of the brine and the corrosion inhibitor.

9. The deicing composition of claim 6, wherein the water solution of salts comprises calcium salts of sodium, magnesium, potassium, calcium, or mixtures thereof.

10. A liquid deicing composition, comprising an aqueous mixture of:
   from about 20% to about 30% by weight relative to the total weight of the aqueous mixture of a deicing agent;
   from about 1.5% to about 3.0% by weight relative to the total weight of the aqueous mixture of a corrosion inhibitor comprising at least one salt of an aldonic or aldaric acid; and
   water,
   wherein the liquid deicing composition is capable of reducing corrosion of mild steel by at least about 70%, as compared to a 3% solution of sodium chloride devoid of the corrosion inhibitor,
   with the proviso that said liquid deicing composition does not comprise molasses solids.

11. The deicing composition of claim 10, wherein the deicing agent is present in an amount ranging from about 23% to about 27%.

12. The deicing composition of claim 10, wherein the deicing agent is present in an amount ranging from about 25% to about 26%.

13. The deicing composition of claim 10, wherein the at least one salt of an aldonic or aldaric acid is selected from the group consisting of salts of gluconic acid, D-erythronic acid, D-gulonic acid, saccharic acid, meso-tartaric acid, tartaric acid, L-mannonic acid, and mixtures thereof.

14. The deicing composition of claim 10, wherein the corrosion inhibitor is capable of reducing the corrosion rate of mild steel in an aqueous solution of 0.153 M sodium chloride by at least about 70% when the corrosion inhibitor is present in the solution at a concentration of 4.0 mM or lower.

* * * * *

UNITED STATES PATENT AND TRADEMARK OFFICE
CERTIFICATE OF CORRECTION

PATENT NO. : 7,658,861 B2 Page 1 of 1
APPLICATION NO. : 11/754560
DATED : February 9, 2010
INVENTOR(S) : Robert Scott Koefod It is certified that error appears in the above-identified patent and that said Letters Patent is hereby corrected as shown below:

In column 7, line 2, in Claim 6, delete "70%." and insert -- 70%, --, therefor.

Signed and Sealed this

Thirtieth Day of March, 2010

David J. Kappos
*Director of the United States Patent and Trademark Office*